US012749776B2

(12) United States Patent
Zhou et al.

(10) Patent No.: US 12,749,776 B2
(45) Date of Patent: Sep. 29, 2026

(54) CONNECTION MEMBER, BATTERY AND BATTERY PACK

(71) Applicant: Hithium Tech HK Limited, HongKong (CN)

(72) Inventors: Long Zhou, Xiamen (CN); Handu Zhang, Xiamen (CN); Yuyuan Wu, Xiamen (CN); Feng Hu, Xiamen (CN); Xichong Zhang, Xiamen (CN); Min Guo, Xiamen (CN)

(73) Assignee: Hithium Tech HK Limited, HongKong (CN)

( * ) Notice: Subject to any disclaimer, the term of this patent is extended or adjusted under 35 U.S.C. 154(b) by 1045 days.

(21) Appl. No.: 17/949,164

(22) Filed: Sep. 20, 2022

(65) Prior Publication Data

US 2023/0110308 A1 Apr. 13, 2023

(30) Foreign Application Priority Data

Sep. 27, 2021 (CN) ........................ 202122354603.X

(51) Int. Cl.

*H01M 50/533* (2021.01)
*H01M 50/536* (2021.01)
*H01M 50/54* (2021.01)

(52) U.S. Cl.

CPC ....... *H01M 50/533* (2021.01); *H01M 50/536* (2021.01); *H01M 50/54* (2021.01)

(58) Field of Classification Search

None
See application file for complete search history.

(56) References Cited

U.S. PATENT DOCUMENTS

2022/0093932 A1* 3/2022 Li ........................ H01M 4/661

FOREIGN PATENT DOCUMENTS

| | | | |
|---|---|---|---|
| CN | 113422168 A | | 9/2021 |
| TW | 201322534 A | * | 6/2013 |
| WO | WO 2020/258754 | * | 12/2020 |

OTHER PUBLICATIONS

Extended European Search Report dated Jan. 27, 2023 received in European Patent Application No. EP22196952.0.

* cited by examiner

*Primary Examiner* — Basia A Ridley
*Assistant Examiner* — Heng M. Chan

(57) ABSTRACT

Provided are a connection member, a battery and a battery pack. The connection member is used for electrically connecting a plurality of tabs of a current collector and includes a connection plate and at least one protrusion arranged on the connection plate and protruding from one side surface of the connection plate in a thickness direction of the connection plate. At least one end of the at least one protrusion in a length direction of the at least one protrusion is formed as a tip in a plane perpendicular to the thickness direction of the connection plate. The tip is configured to puncture the plurality of tabs in the length direction of the at least one protrusion.

18 Claims, 8 Drawing Sheets

CONNECTION MEMBER, BATTERY AND BATTERY PACK

CROSS-REFERENCE TO RELATED APPLICATIONS

The present application is based on and claims priority to Chinese Patent Application No. 202122354603.X, filed on Sep. 27, 2021, the entire content of which is incorporated herein by reference.

TECHNICAL FIELD

The present disclosure relates to the field of battery technologies, and in particular, to a connection member, a battery and a battery pack.

BACKGROUND

In related art, as for a current solution for connecting a composite tab, a protrusion is formed on a soft connection/welding sheet and punctures a single layer or a plurality of layers of composite tabs by an ultrasonic process. The protrusion is bonded with a soft connection/welding sheet on the other side. Through principle of the ultrasonic process, a friction welding is performed by a welding head together with the protrusion in a height direction of the tab. However, in this technical solution, a current flowing channel would be narrowed due to a lateral cracking of the tab.

SUMMARY

The present disclosure is directed to at least solving one of the technical problems in the prior art. For this reason, the present disclosure proposes a connection member. For the connection member, by forming at least one end of at least one protrusion in a length direction of the at least one protrusion as a tip, resistance of a tab to a connection sheet is weakened, so that a force exerted on the tab by the connection sheet is relatively concentrated, thereby reducing possibility that a current flowing channel is narrowed due to a lateral cracking of the tab.

The present disclosure also proposes a battery.

The present disclosure also proposes a battery pack.

A connection member for electrically connecting a plurality of tabs of a current collector according to embodiments of the present disclosure includes a connection plate and at least one protrusion arranged on the connection plate and protruding from one side surface of the connection plate in a thickness direction of the connection plate. At least one end of each of the at least one protrusion in a length direction of the at least one protrusion is formed as a tip in a plane perpendicular to the thickness direction of the connection plate. The tip is configured to puncture the plurality of tabs in the length direction of the at least one protrusion.

For the connection member according to the embodiments of the present disclosure, by forming at least one end of each of the at least one protrusion in the length direction of the at least one protrusion as the tip in the plane perpendicular to the thickness direction of the connection plate, resistance of the tab to a connection sheet is weakened, so that a force exerted on the tab by the connection sheet is relatively concentrated, thereby reducing the possibility that the current flowing channel is narrowed due to the lateral cracking of the tab.

In some embodiments, each of the at least one protrusion includes a main section and a spike section that are connected to each other on one side surface of the connection plate. The spike section is connected to at least one end of the main section. Tn the length direction of the at least one protrusion, the main section extends straightly and has an identical cross section, and the spike section is formed as the tip in the plane perpendicular to the thickness direction of the connection plate.

In some embodiments, the spike section has a cross-section decreasing in a direction from the main section to the spike section.

In some embodiments, a cross section of the spike section parallel to the one side surface of the connection plate is formed in a semicircular, semi-elliptic, arcuate, trapezoidal or triangular shape.

In some embodiments, a cross section of the spike section parallel to the one side surface of the connection plate is formed in a triangular shape, and the spike section has an apex angle ranging from 20° to 120°.

In some embodiments, a chamfered or rounded section is formed between an end of the spike section away from the main section and an end of the spike section away from the connection plate, or a chamfered or rounded section is formed between an end of the spike section away from the main section and an end of the main section away from the connection plate.

In some embodiments, the spike section has a length smaller than or equal to 2 mm in a direction from the main section to the spike section.

In some embodiments, each of the at least one protrusion includes a connection section and a puncturing section that are connected to each other in a protruding height direction of the at least one protrusion. The connection section is connected to the connection plate, and the puncturing section is connected to an end of the connection section away from the connection plate and is configured to puncture the plurality of tabs in the thickness direction of the connection plate.

In some embodiments, the one side surface of the connection plate is in an arc connection with a side surface of the connection plate parallel to the thickness direction of the connection plate.

In some embodiments, the connection plate and of the at least one protrusion are integrally formed, and/or the at least one protrusion is arranged in a matrix on the one side surface of the connection plate.

A battery according to embodiments of the present disclosure includes a current collector and a conductive connection assembly. The current collector includes a plurality of electrode plates laminated to each other, and each of the plurality of electrode plates includes a tab. The conductive connection assembly includes the connection member according to any one of embodiments as described above, and the at least one protrusion of the connection member penetrates the plurality of tabs and is electrically connected to the tabs.

For the battery according to the present disclosure, by applying the current collector assembly as described above to the battery, an assembly difficulty of the battery is lowered, and the manufacturing time of the battery is shortened. In addition, the labor cost is lowered, and the reliability of the battery is ensured.

In some embodiments, the at least one protrusion is electrically connected to the plurality of tabs by puncturing the plurality of tabs through a high-frequency vibration. A vibration direction of the high-frequency vibration is parallel to the length direction of the at least one protrusion.

In some embodiments, each of the plurality of electrode plates includes a support insulation layer, a first conductive layer and a second conductive layer, and the first conductive layer and the second conductive layer cover two side surfaces of the support insulation layer in a thickness direction of the support insulation layer, respectively.

A battery pack according to embodiments of the present disclosure includes the battery according to the above embodiments of the present disclosure.

For the battery pack according to the embodiments of the present disclosure, by providing the battery as described above, safety performance of the battery pack can be improved and reliability of the battery pack is ensured, thereby avoiding dangers from occurring.

The additional aspects and the advantages of the present disclosure will be partially set forth in the following description, and in part will be apparent from the following description, or may be learned by practice of the present disclosure.

BRIEF DESCRIPTION OF DRAWINGS

FIG. 1I is a schematic view of the tab shown in FIG. 2.

Figure 1:
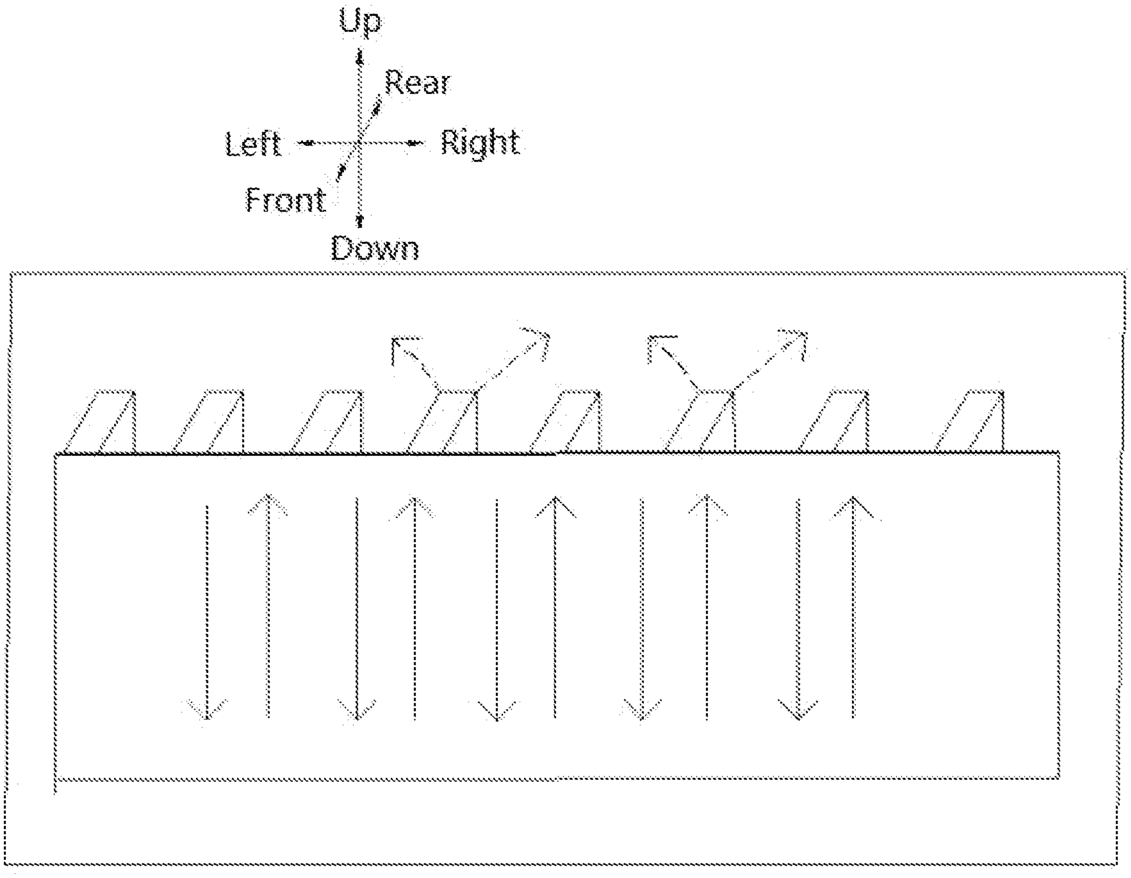
FIG. 1 is a schematic view of welding a connection member and a tab in the related art, wherein solid arrows represent an ultrasonic welding direction, and dotted arrows represent a cracking direction of the tab.

REFERENCE SIGNS connection member 100;
connection plate 110;
protrusion 120;
main section 121, spike section 122, connection section 123, puncturing section 124;
tab 200;
support insulation layer 210, first conductive layer 220, second conductive layer 230.

DESCRIPTION OF EMBODIMENTS

Embodiments of the present disclosure will be described in detail below, and examples of the embodiments are shown in the accompanying drawings, in which identical or similar reference signs denote identical or similar elements or elements with identical or similar functions through the accompanying drawings. The following embodiments described with reference to the drawings are illustrative and intended to explain the present disclosure, rather than being interpreted as limitations on the present disclosure.

Firstly, a battery according to embodiments of the present disclosure will be briefly described with reference to FIGS. 1 to 12. The battery includes a current collector and a conductive connection assembly.

Figure 11:
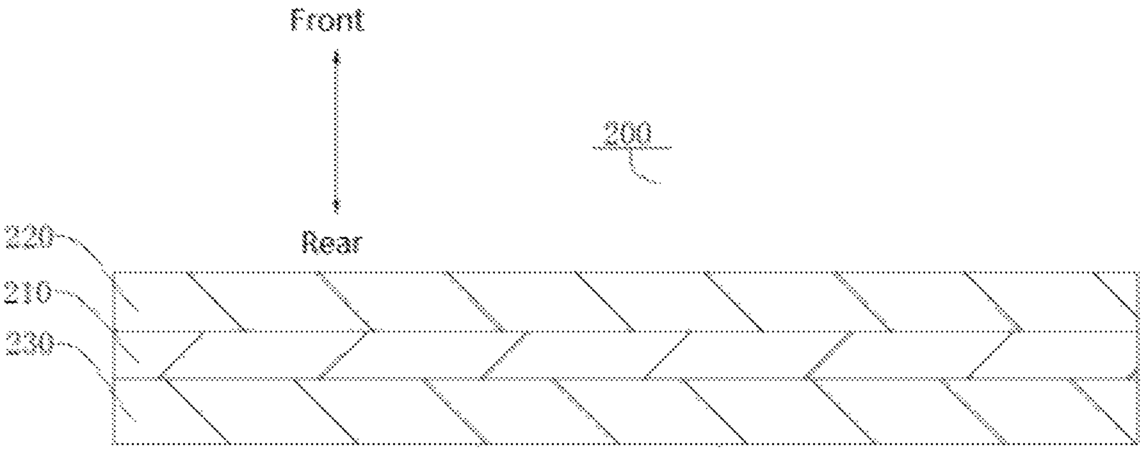

In an embodiment, as shown in FIG. 11, the current collector includes a plurality of electrode plates laminated to each other. Each of the plurality of electrode plates includes a tab 200. In addition, the conductive connection assembly incudes a connection member 100 having a plurality of protrusions 120. The plurality of protrusions 120 is configured to penetrate a plurality of tabs 200 and be electrically connected to the tabs 200.

The connection member 100 according to embodiments the present disclosure will be described with reference to FIGS. 1 to 12 below.

Figure 2:
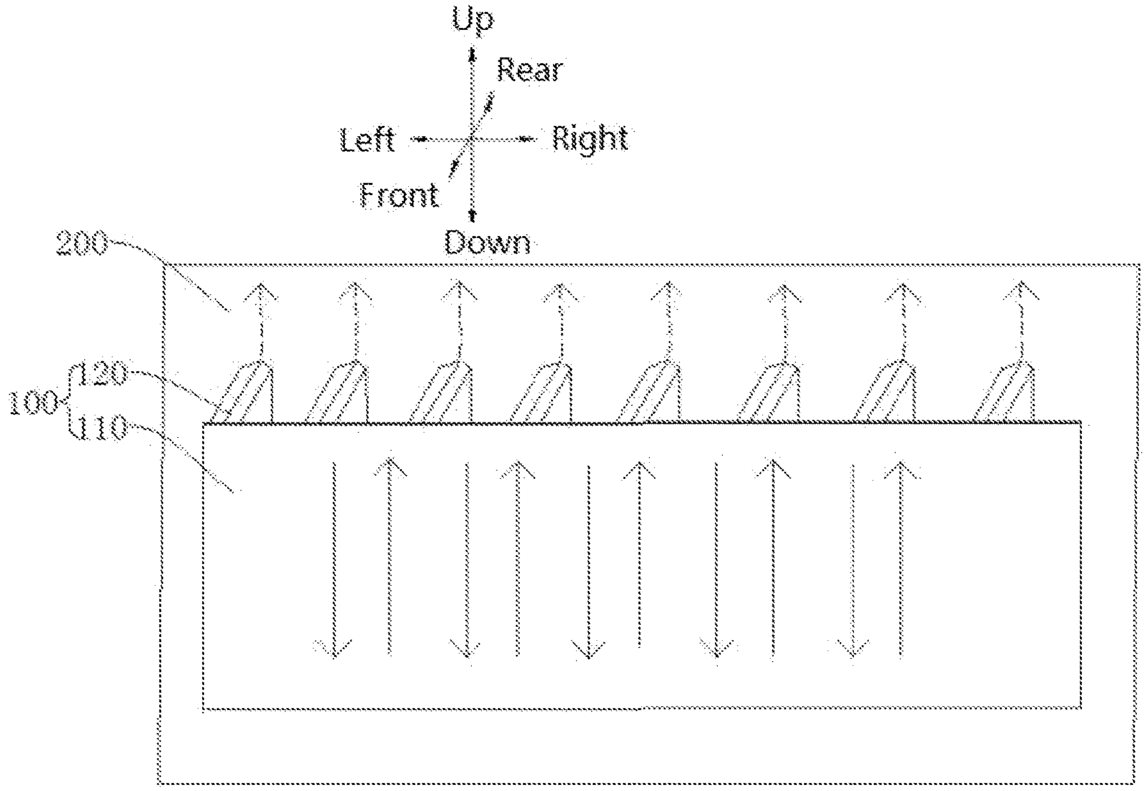
FIG. 2 is a schematic view of welding a connection member and a tab according to an embodiment of the present disclosure, wherein solid arrows represent an ultrasonic welding direction, and dotted arrows represent a cracking direction of the tab.

As shown in FIG. 2, the connection member 100 according to the embodiment of the present disclosure is configured to electrically connect the plurality of tabs 200 of the current collector, and includes a connection plate 110 and at least one protrusion 120.

In an embodiment, as shown in FIG. 2, the connection plate 110 is formed in a rectangular plate shape. The protrusion 120 is arranged on the connection plate 110 and protrudes from one side surface (for example, a rear side of the connection plate 110 in FIG. 2) of the connection plate 110 in a thickness direction (for example, a front-back direction shown in FIG. 2). At least one end (for example, an upper end of the protrusion 120 shown in FIG. 2) of the protrusion 120 in a length direction is formed as a tip in a plane perpendicular to the thickness direction of the connection plate 110. That is, one end of the protrusion 120 in the length direction may be formed as the tip, or both ends of the protrusion 120 in the length direction may also be formed as the tip. The tip is configured to puncture the plurality of tabs 200 in the length directions (for example, an up-down direction shown in FIG. 2) of the protrusion 120.

In the related art, since two ends of the protrusion portion has flat surface, resistance of the tab to the connection member is increased. Further, due to interaction force, an effect of an end surface of the connection member on the tabs is strengthened, which easily causes the tab to crack outwards. Therefore, resistance of the tab 200 to a connection sheet is weakened, and thus a force exerted on the tab 200 by the connection sheet to the tab 200 is relatively concentrated, thereby avoiding a current flowing channel from being narrowed due to a lateral cracking of the tab 200.

It should be noted that the current flowing channel refers to a channel, through which the current flows. The current flows in a direction away from the battery along the tab 200. In the related art, as shown in FIG. 1, the two end surfaces of the protrusion in the length directions are both formed as flat surface. The tab is pressed by the protrusion in such a manner that the tab may laterally crack, which may cause the current flowing channel to be narrowed, thereby affecting the flowing of the current. In the present disclosure, as shown in FIG. 2, at least one end of the protrusion 120 in the length direction is formed as the tip in the plane perpendicular to the thickness direction of the connection plate 110. After the tab 200 is pressed by the protrusion 120, on a part of the tab 200 in contact with the tip cracks in the length direction of the protrusion 120. The length direction of the protrusion 120 is same as a current transmission direction. Therefore, it is possible to avoid the current flowing channel from being narrowed due to the lateral cracking of the tab 200.

For example, as shown in FIG. 2, the protrusion 120 is arranged on a side surface of the connection plate 110 facing towards the tab 200 in the thickness direction of the connection plate 110. Further, the two ends of the protrusion 120 in a length direction thereof are formed as tips in a plane perpendicular to the thickness direction of the connection plate 110. Therefore, resistance of the two end surfaces of the protrusion 120 in the length direction to the tab 200 is weakened, which in turn avoids the lateral cracking of the tab 200 due to concentrated force of the two ends of the protrusion 120 in the length direction to the tab.

For the connection member 100 according to the embodiments of the present disclosure, by forming at least one end of the protrusion 120 in the length direction as the tip in the plane perpendicular to the thickness direction of the connection plate 110, resistance of the tab 200 to a connection sheet is weakened, so that the force exerted on the tabs by the connection sheet is relatively concentrated, thereby preventing the current flowing channel from being narrowed due to the lateral cracking of the tab 200.

Figure 5:
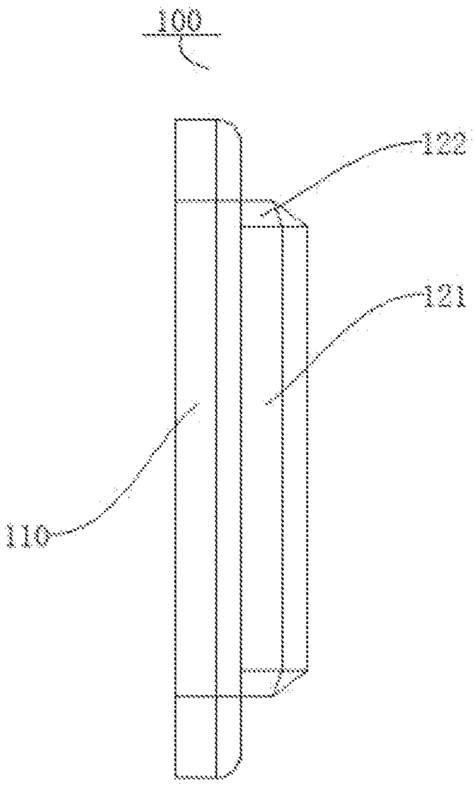
FIG. 5 is a right view of the connection member shown in FIG. 3.

In an embodiment of the present disclosure, as shown in FIG. 5, the protrusion 120 may include a main section 121 and a spike section 122 that are connected to each other on one side surface of the connection plate 110. The spike section 122 is connected to at least one end of the main section 121. The main section 121 extends straightly and has an identical cross section in the length direction of the protrusion 120. The spike section 122 is formed as the tip in the plane perpendicular to the thickness direction of the connection plate 110. Therefore, the resistance of the end surface of the protrusion 120 to the tab 200 is weakened, which in turn prevents the lateral cracking of the tab 200 since the force exerted on the tab 200 by the end surface of the protrusion 120 to the tab 200 is relatively concentrated.

For example, as shown in FIG. 5, the protrusion 120 is arranged on the one side surface of the connection plate 110 facing towards the tab 200 in the thickness direction of the connection plate. The protrusion 120 includes a main section 121 and a spike section 122 that are connected to each other. The spike section 122 is connected to two ends of the main section 121 in a length direction of the main section 121 and is formed as the tip in the plane perpendicular to the thickness direction of the connection plate 110. Therefore, the resistance of the two end surfaces of the protrusion 120 in the length direction to the tab 200 is weakened, which in turn prevents the lateral cracking of the tab 200 since the force exerted on the tabs by the two end surfaces of the protrusion 120 in the length direction is relatively concentrated.

In an embodiment of the present disclosure, as shown in FIG. 5, the spike section 122 has a cross-section area decreasing in a direction from the main section 120 to the spike section 122. That is, a cross-section area of one end of the spike section 122 away from the main section 121 is smaller than that of one end of the spike section 122 facing towards the main section 121. In this way, during pressing the protrusion 120 into the tabs, instead of the flat surface in the related art, the one end of the spike section 122 with the smaller cross-section area punctures the tabs 200 to achieve the connection. Thus, resistance of pressing the protrusion 120 into the tab 200 can be weakened, thereby reducing the lateral cracking of the tab 200.

For example, as shown in FIG. 5, the spike section 122 is formed on each of two end surfaces of the main section 121 in the length direction. The spike section 122 has a cross-section area decreasing to near zero in a direction from the main section 121 to the spike sections 122. In this way, during pressing the protrusion 120 into the tab 200, instead of two flat surfaces in the related art, the two spike sections 122 can puncture the tab 200 to achieve the connection. Thus, a welding difficulty between the tab 200 and the connection member 100 can be lowered, and a welding time between the tab 200 and the connection member 100 can be shortened, thereby improving a production efficiency and reducing the lateral cracking of the tab 200.

Further, the main section 121 and the spike section 122 are in smooth transition. As a frication is generated between the tab 200 and the protrusion 120 during the welding, the protrusion 120 in which the main section 121 and the spike section 122 are in smooth transition is not prone to damage the tab 200. Thus, it is possible to recede the possibility of the lateral cracking of the tab 200 and prolong service lives of the tab 200. Further, it is possible to ensure the yield of the battery, thereby improving the safety reliability of the battery pack.

Figure 7:
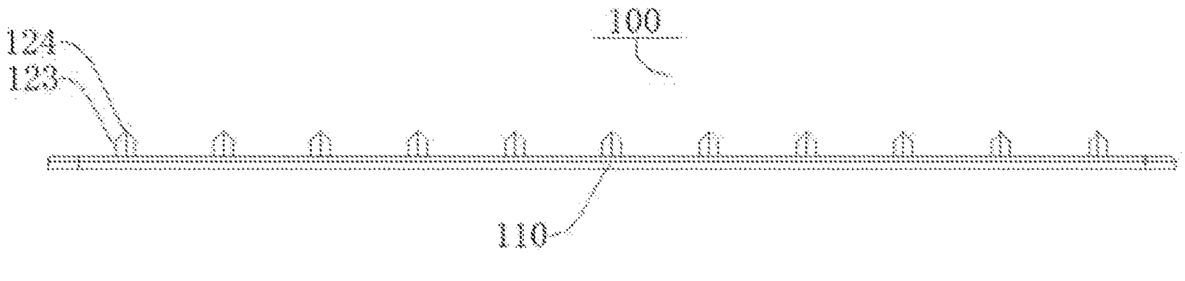
FIG. 7 is a top view of the connection member shown in FIG. 6.

In an embodiment of the present disclosure, as shown in FIG. 7, a side surface of the spike section 122 parallel to the connection plate 110 has a semicircular, semi-elliptic, arcuate, trapezoidal or triangular cross section. In this way, it is possible to reduce the possibility of lateral cracking of the tab 200 since the force exerted on the tab 200 by the end surface of the protrusion 120 is relatively concentrated.

In some embodiment, as shown in FIG. 7, the side surface of the spike section 122 parallel to the connection plate 110 has a triangular cross section. In this way, it is possible to reduce the possibility of the lateral cracking of the tab 200 since the force exerted on the tab 200 by the end surface of the protrusion 120 is relatively concentrated. Meanwhile, a puncturing effect of the protrusion 120 on the tab 200 can be optimized.

Figure 12:
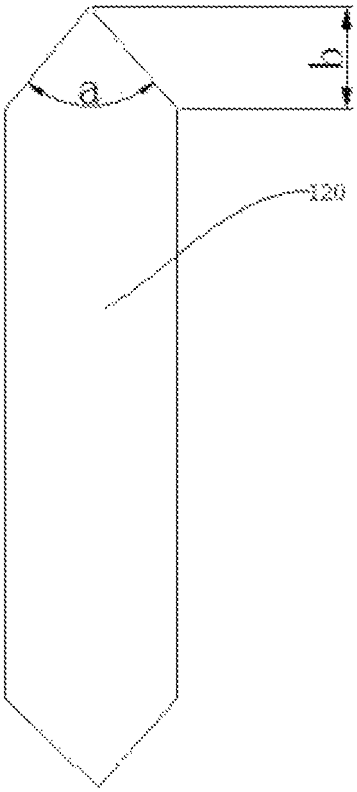
FIG. 12 is a sectional view of a protrusion shown in FIG. 2.

In an embodiment of the present disclosure, as shown in FIG. 12, the side surface of the spike section 122 parallel to the connection plate 110 has a triangular cross section, and the spike section has an apex angle 122 ranging from 20° to 120°. That is, if the apex angle of the spike section 122 ranges from 20° to 120°. Selecting the apex angle of the spike section 122 within this range can prevent the current flowing channel from being narrowed due to the lateral cracking of the tab 200.

It should be noted that when the apex angle of the spike section 122 is set to be greater than 120°, during pressing the protrusion 120 into the tab 200, there is still a great possibility that the tab 200 cracks laterally. since the main section 121 has constant lengths in the length direction and the thickness direction, when the apex angle of the spike section 122 is set to be smaller than 20°, the spike section 122 may have too large height in a direction away from the main section 121.

In a specific implementation, the apex angle of the spike section 122 may be set as 20°, 40°, 60°, 80°, 100° and 120°. For example, as shown in FIG. 1, the apex angle of the spike section 122 is set as 60°. In this way, it is possible to prevent the current flowing channel from being narrowed due to the lateral cracking of the tab 200.

Figure 8:
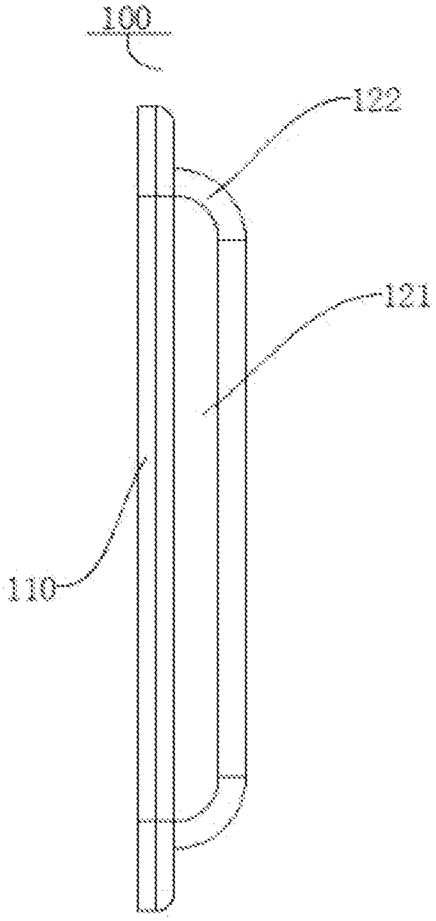
FIG. 8 is a right view of the connection member shown in FIG. 6.
Figure 9:
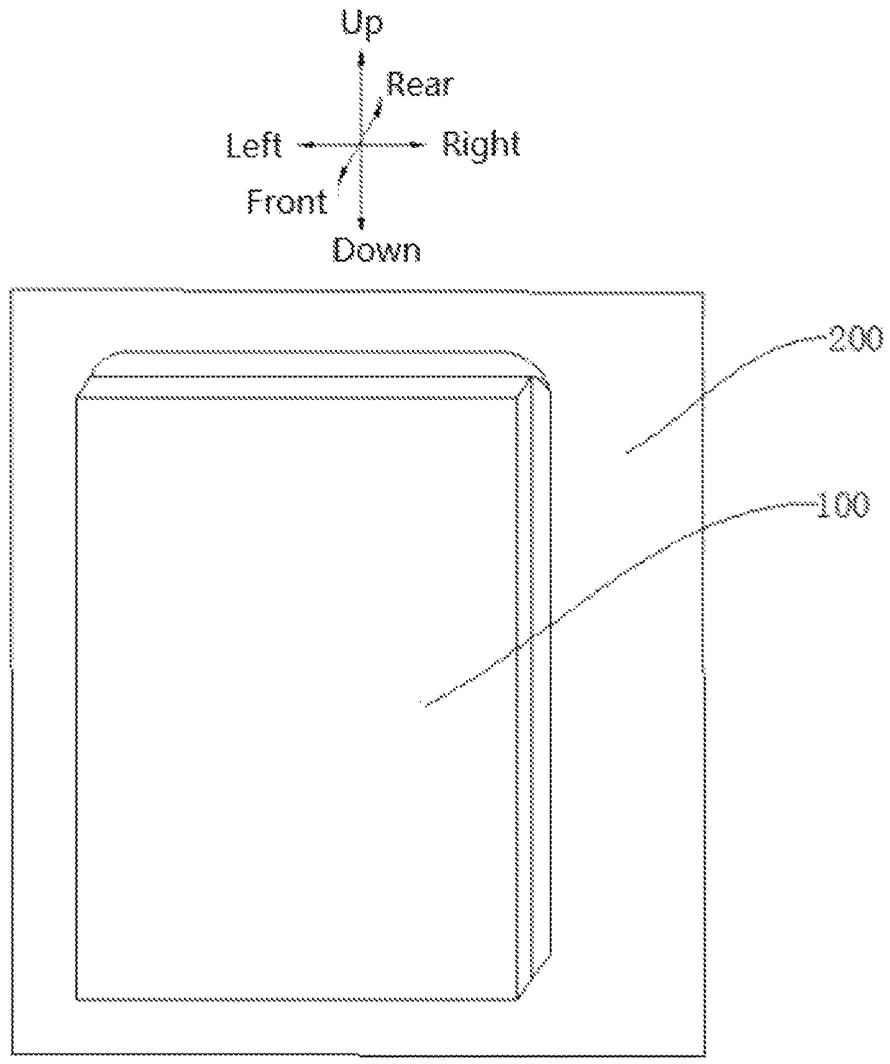
FIG. 9 is a schematic view of a completed welding between a connection member and a tab according to an embodiment of the present disclosure.
Figure 10:
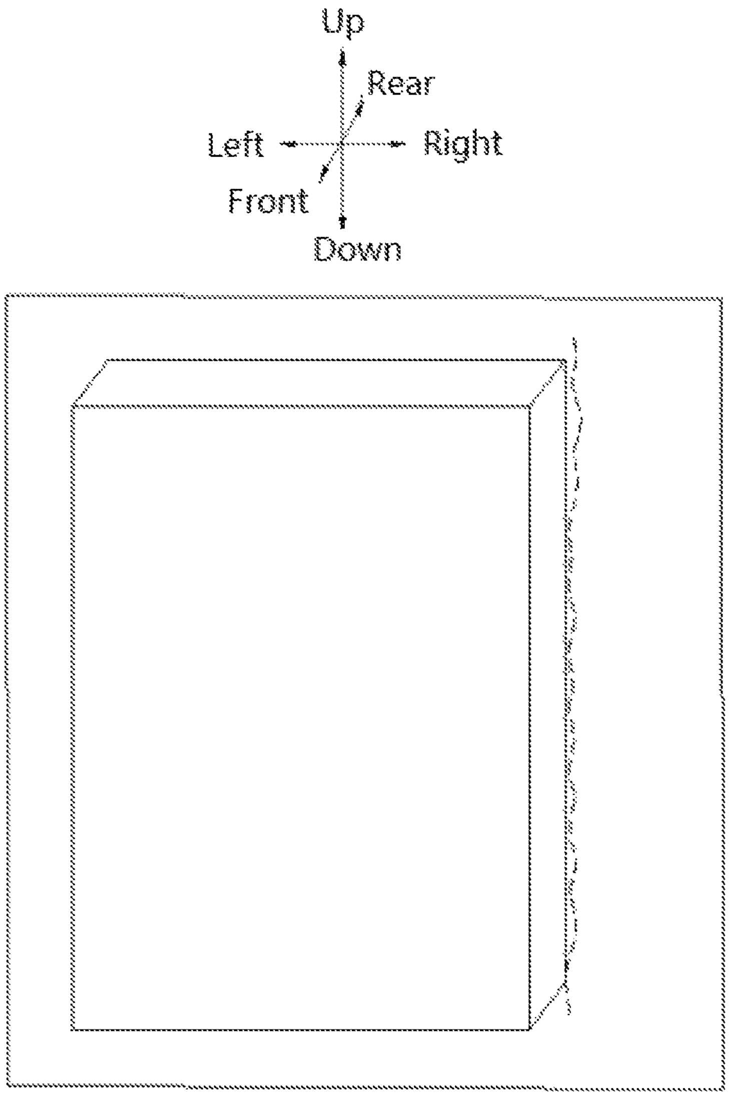
FIG. 10 is a schematic view of a completed welding between a connection member and a tab in the related art, wherein a dotted line represents a cracking direction of the tab.

In an embodiment of the present disclosure, as shown in FIG. 8 and FIG. 5, a chamfered or rounded section is formed between one end of the spike section 122 away from the main section 121 and one end of the spike section 122 away from the connection plate 110, or a chamfered or rounded section is formed between one end of the spike section 122 away from the main section 121 and one end of the main section 121 away from the connection plate 110, so that the spike section 122 is in smooth connection with the main section 121. Therefore, resistance of pressing the protrusion 120 into the plurality of tabs 200 is conveniently weakened.

In an embodiment of the present disclosure, as shown in FIG. 12, the spike section 122 has a length smaller than or equal to 2 mm in a direction from the main section 121 to the spike section 122. That is, if the length of the spike section 122 is defined as b, b is smaller than or equal to 2 mm.

In an embodiment, the length of the spike section 122 may be set as 2 mm, 1.8 mm, 1.6 mm, 1.4 mm, 1.2 mm, 1 mm, 0.8 mm, 0.6 mm, 0.4 mm, 0.2 mm and the like. Thus, the puncturing effect of the protrusion 120 can be ensured, and the welding difficulty between the tabs 200 and the connection member 100 is lowered. In addition, the possibility that the tab 200 cracks laterally can be reduced.

In an embodiment, the length of the spike section 122 may be set as 0.8 mm, 0.6 mm, 0.4 mm and 0.2 mm. Thus, the puncturing effect of the protrusion 120 can be ensured, and the welding difficulty between the tab 200 and the connection member 100 is lowered. In addition, the possibility that the tab 200 cracks laterally can be reduced.

Figure 4:
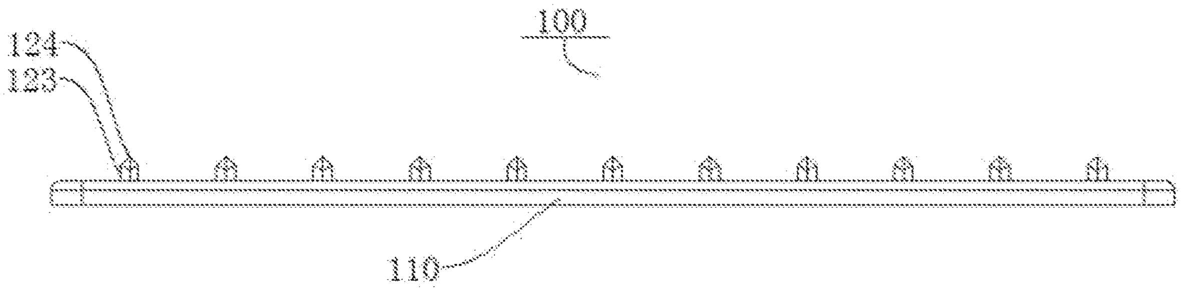
FIG. 4 is a top view of the connection member shown in FIG. 3.

In an embodiment of the present disclosure, as shown in FIG. 4 and FIG. 7, the protrusion 120 includes a connection section 123 and a puncturing section 124 that are connected to each other in a protruding height direction of the protrusion 120. The connection section 123 is connected to the connection plate 110, and the puncturing section 124 is connected to an end of the connection section 123 away from the connection plate 110. The puncturing section 124 is configured to puncture the plurality of tabs 200 in the thickness direction of the connection plate 110. Therefore, the connection member 100 is conveniently pressed into the tab 200, thereby reducing the welding difficulty.

Further, the puncturing section 124 has a cross-section area decreasing in a height direction (for example, in a front-back direction, as shown in FIG. 2) of the protrusion direction 120. Since the puncturing section 124 has the cross-section area decreasing in the height direction of the protrusion 120, the puncturing section 124 has a maximum cross-section area closer to the protrusion 120, and a minimum cross-section away from the protrusion 120. Therefore, the protrusion 120 can more easily puncture the plurality of tabs 200*m*, and the welding difficulty between the tabs 200 and the connection member 100 is lowered, thereby shortening the welding time between the tabs 200 and the connection member 100 and improving the production efficiency.

For example, as shown in FIG. 2, the connection section 123 is electrically connected to the plurality of tabs 200, and has an identical cross-section area in an up-down direction. The puncturing section 124 of the protrusion 120 is configured to puncture the plurality of tabs 200, and the connection section 123 of the protrusion 120 is configured to connect the plurality of tabs 200. Therefore, a welding energy can easily transmit the connection member 100 and the tabs 200, thereby lowering the welding difficulty between the tabs 200 and the connection member 100 and shortening manufacturing time. In addition, a connection strength between the tabs 200 and the connection member 100 is improved, and connection is firm. Further, it is possible to enhance a connection strength while ensuring the puncturing effect of the protrusion 120.

Further, as shown in FIG. 4 and FIG. 7, the protrusion 120 includes a connection section 123 and a puncturing section 124. When the protrusion 120 is formed on the connection plate 110, an end of the connection section 123 is connected to the connection plate 110, and the other end of the connection section 123 is connected to the puncturing section 124. The puncturing section 124 has a puncturing end for puncturing the plurality of tabs 200.

Figure 3:
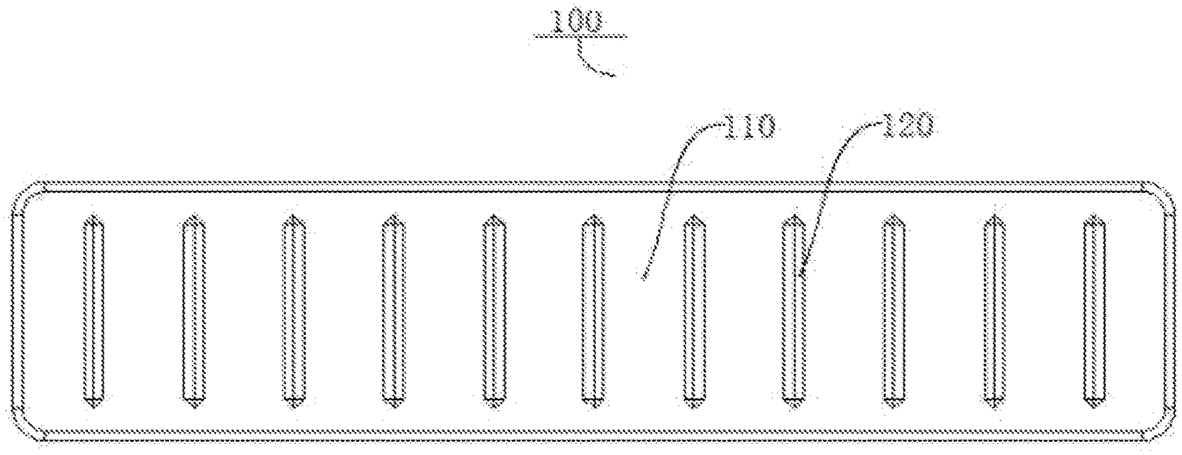
FIG. 3 is a rear view of the connection member shown in FIG. 2.
Figure 6:
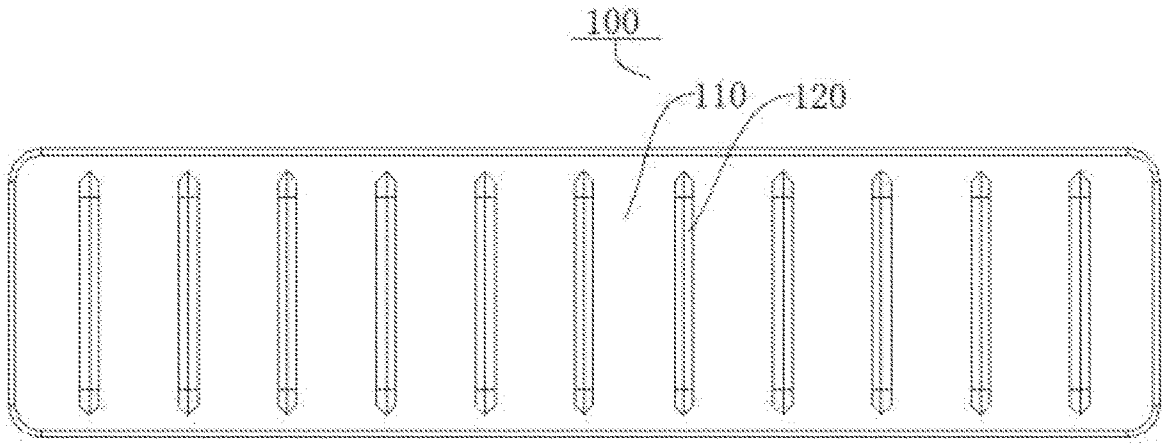
FIG. 6 is a rear view of the connection member shown in FIG. 2 according to another embodiment of the present disclosure.

In an embodiment of the present disclosure, as shown in FIG. 3 and FIG. 6, the one side surface of the connection plate 110 is in an arc connection with a side surface of the connection plate 110 parallel to the thickness direction. However, in the related art, a part of the connection plate in contact with the tab is pressed in a right angle. Due to a right-angle side, single-point stresses on the tabs are relatively large, which may easily result in the lateral cracking of the tab. However, in the present disclosure, a contact area between the connection plate 110 and the tab 200 is increased, and thus the single-point stresses on the tab 200 is weakened, thereby lowering the risk that the tab 200 cracks.

For example, as shown in FIG. 3, a side surface of the connection plate 110 facing towards the tab 200 is in the arc connection with the side surface of the connection plate 100 parallel to the thickness direction. After the protrusion 120 of the connection member 100 is pressed into the tab 200, a part of the connection plate 110 can be continuously pressed into the tab 200. With such arrangement, the contact areas between the connection plate 110 and the tabs 200 can be conveniently increased, and the single-point stresses on the tabs 200 are weakened, thereby lowing the risk that the tab 200 cracks.

In an embodiment of the present disclosure, as shown in FIG. 6, the connection plate 110 and a plurality of protrusions 120 are integrally formed, and/or the plurality of protrusions 120 is arranged in a matrix on the one side surface of the connection plate. With the plurality of protrusions 120 arranged in the matrix, the connecting strength between the tabs 200 and the protrusion 120 are improved. Further, it is possible to prevent the tabs 200 from being separated from the protrusion 120 during transporting or using, thereby increasing the yield of the battery. In addition, the contact areas between the protrusion 120 and each layer of tab 200 are increased, thereby increasing a current flowing area with balanced heat dissipation. Thus, the battery is less prone to failure, and reduces a risk factor of the user, thereby improving the user's experience.

Here, the protrusion 120 and the connection plate 110 are integrally formed. Therefore, the protrusion 120 and the connection plate 110 are the same in parameters of temperature resistance, resistance and the like, thereby ensuring the reliability of the battery 1000, and lowering the fault rate. In addition, it is also possible to ensure the use safety of the battery pack, thereby avoiding accidents from occurring. Meanwhile, the number of parts of the connection member 100 is reduced, which in turn improves the whole connection strength of the conductive connection assembly and the connection stability between the protrusion 120 and the tab 200, thereby lowering the rate of defective products of the conductive connection assembly and prolonging the service life of the conductive connection assembly.

In some embodiments of the present disclosure, as shown in FIG. 2, in a direction perpendicular to an ultrasonic wave vibration, a spacing between two adjacent protrusions 120 is greater than or equal to a width of the protrusion 120. That is, the spacing between two adjacent protrusion 120 in the direction perpendicular to the ultrasonic wave vibration is greater than or equal to the width of the protrusion 120. Therefore, a placing direction of the connection plate 110 during welding can be clearly distinguished, so that the production efficiency can be improved, and the welding between the protrusion 120 and the tabs 200 can further be firmer.

In some embodiments of the present disclosure, if the protrusion 120 has a length L in the direction of the ultrasonic wave vibration and a width d in the direction perpendicular to the ultrasonic wave vibration, L and d satisfy: L*2+d*2≥X, where X is a width of the tab 200. It should be understood that a perimeter of the protrusion 120 should be no less than the width of the tab 200. Here, it is also noted that the width X of the tab 200 is a length of a side of the tab 200 in the direction perpendicular to the ultrasonic wave vibration. Referring to FIG. 2, a length of the tab 200 in a left-right direction is the width of the tab 200.

A battery according to embodiments of the present disclosure includes a current collector and a conductive connection assembly.

In some embodiments, the current collector includes a plurality of electrode plates laminated to each other, and each of the plurality of electrode plates includes a tab 200. The conductive connection assembly includes a connection member 100 according to the embodiments of the present disclosure as described. The plurality of protrusions 120 of the connection member 100 penetrates a plurality of tabs 200 and is electrically connected to the tabs 200.

Here, the plurality of tabs 200 is laminated to each other in the thickness directions of the tabs 200. The connection plate 110 is arranged on a side of the plurality of tabs 200 in the thickness directions. One end of the protrusion 120 is connected to the connection plate 110. The protrusion 120 penetrates the plurality of tabs 200 and is electrically connected to the tabs 200. The protrusion 120 may be formed on the connection plate 110, and puncture the plurality of tabs 200 by a high-frequency vibration at a vibration frequency ranging from 15 KHz to 40 KHz.

The protrusion 120 punctures the plurality of tabs 200 by the high-frequency vibration, and the high-frequency vibration is applied on a contact surface of an object to be welded, so that a friction is generated between surfaces of two objects to generate heat, thereby forming fusion between molecular layers, which in turn increased a welding speed between the protrusion 120 and the plurality of tabs 200, thereby ensuring stable connection between the tabs 200 and the connection member 100.

For the battery according to the embodiments of the present disclosure, by applying the connection member 100 according to the above embodiments to the battery, the assembly difficulty of the battery is lowered, and the manufacturing time of the battery is shortened. In addition, the labor cost is lowered, and the reliability of the battery is ensured.

In an embodiment of the present disclosure, as shown in FIG. 2, the protrusions 120 are electrically connected to the tabs 200 by puncturing the plurality of tabs 200 through the high-frequency vibration, and a vibration direction of the high-frequency vibration is parallel to the length direction of the protrusion 120. Therefore, the protrusion 120 penetrates the plurality of tabs 200 and fixes the connection member 100 to the plurality of tabs 200.

Here, as shown in FIG. 2, an extension direction of the protrusion 120 may be parallel to the vibration direction of the high-frequency vibration. Since the extension direction of the protrusion 120 are same to the vibration direction of the high-frequency vibration, it is possible to facilitate increase in the welding speed between the protrusion 120 and the tabs 200, and to shorten the production time, thereby improving the production efficiency.

In some embodiments, the high-frequency vibration is a vibration generated by an ultrasonic welding. The ultrasonic welding replaces the traditional welding/adhesion process due to its rapid welding speed, high welding strength and good sealing performance. Further, the ultrasonic welding is low in cost, is clean without pollution and cannot damage a soft connection sheet and the tabs 200. In addition, the welding process is stable, and the electrical conductivity is good after welding, thereby a resistance coefficient is very low or is close to zero. Also, the ultrasonic welding is short in welding time, does not require any soldering flux, gas and solder, and does not generate sparks in the welding process and is environmentally friendly and safe.

In some embodiments, a welding pressure of the ultrasonic welding is not less than 20 N, and the welding time is not less 30 ms.

In an embodiment of the present disclosure, the electrode plate may include a support insulation layer 210, a first conductive layer 220 and a second conductive layer 230. The first conductive layer 220 and the second conductive layer 230 cover the two side surfaces of the support insulation layer 210 in a thickness direction of the support insulation layer 210, respectively. Referring to FIG. 11, the support insulation layer 210 is located between the first conductive layer 220 and the second conductive layer 230, and the first conductive layer 220 and the second conductive layer 230 cover an upper surface and a lower surface of the support insulation layer 210, respectively.

In an embodiment, the support insulation layer 210 is a composite polymeric insulation layer.

A battery pack according to embodiments of the present disclosure includes the battery according to the above embodiments.

For the battery pack according to the embodiments of the present disclosure, by providing the battery as described above, safety performance of the battery pack is improved, and reliability of the battery pack is ensured, thereby avoiding dangers from occurring.

A battery according to an embodiment of the present disclosure will be described with reference to FIGS. 1-12 below.

Referring to FIG. 2, the connection member 100 is welded to the plurality of tabs 200 through an ultrasonic welding. The connection member 100 is placed at a welding position on the electrode plate firstly. Then, an ultrasonic welding head is abutted against the connection member 100, and a welding between the connection member 100 and the tabs 200 is completed by a high-frequency vibration of an ultrasonic pen. In the welding process, the protrusion 120 on the connection member 100 is firstly brought into contact with the tab 200, such that the puncturing section 124 on the protrusion 120 punctures the tab 200. Then, the connection section 123 and the spike section 122 enter the plurality of tabs 200. When some of the protrusions 120 completely puncture into the plurality of tabs 200, the connection plate 110 is continuously pressed into the tabs 200 by a distance, so that the connection member 100 is completely fixed to the plurality of tabs 200, and the welding process is finished.

For the connection member 100 according to the embodiments of the present disclosure, by forming at least one end of the protrusion 120 in the length direction as the tip in the plane perpendicular to the thickness direction of the connection plate, the resistance of the tab 200 to the connection sheet is weakened, so that the force exerted on the tab 200 by the connection sheet is concentrated, thereby preventing the current flowing channel from being narrowed due to the lateral cracking of the tab 200.

In description of the present disclosure, it should be understood that orientations or positional relationships indicated by terms "center," "longitudinal," "transverse," "length," "width," "thickness," "upper," "lower," "front," "rear," "left," "right," "vertical," "horizontal," "top," "bottom," "inner," "outer," "clockwise," "anticlockwise," "axial," "radial," "circumferential" and the like are based on orientations or positional relationships shown in the drawings, and facilitate the description of the present disclosure and simplify the description merely, rather than indicating or implying that the associated apparatus or element must have specific orientations and are constructed and operated in the specific orientations, and thus should not be construed to limit the present disclosure.

Moreover, the terms "first" and "second" are used only for description and shall not be interpreted as an indication or implication of relative importance or an implicit indication of the number of technical features. Thus, features associated with "first" and "second" may include at least one or more such features, either explicitly or implicitly. In the description of the present disclosure, "a plurality of" means two or more, unless otherwise specifically defined.

In the present disclosure, unless otherwise specifically stated and defined, terms "mounted", "coupled", "connected", "fixed" and the like should be understood broadly. For example, it may be a fixed connection or detachable connection or integrally formed; it may be a mechanical connection, an electric connection, or a communication; it may be a direct connection, an indirect connection through an intermediary, or a communication between the interiors of two elements or mutual acting relationship between the two elements. The specific meanings of the above terms in the present disclosure may be understood by those of ordinary skill in the art as desired.

In descriptions of this specification, descriptions in the reference terms "an embodiment", "some embodiments", "example", "specific example", "some examples" or the like mean that the specific features, structures, materials or characteristics described in combination with the embodiments or the examples are included in at least one embodiment or example of the present disclosure. In the present specification, the schematic representation of the above terms does not necessarily mean the same embodiment or example. Moreover, the described specific features, structures, materials or characteristics may be combined in any one or more embodiments or examples in a suitable mode. In addition, various embodiments or examples described in the specification, as well as features of various embodiments or examples, may be combined by those skilled in the art without contradicting each other.

While the embodiments of the present disclosure have been illustrated and described, it should be understood to those of ordinary skill in the art that various changes, modifications, substitutions and alterations can be made to these embodiment without departing from the principle and the spirit of the present disclosure, and the scope of the present disclosure is defined by the appended claims and equivalents thereof.

What is claimed is:

1. A connection member for electrically connecting a plurality of tabs of a current collector, the connection member comprising:

a connection plate; and at least one protrusion arranged on the connection plate and protruding from one side surface of the connection plate in a thickness direction of the connection plate, wherein at least one end of the at least one protrusion in a length direction of the at least one protrusion is formed as a tip in a plane perpendicular to the thickness direction of the connection plate, and wherein the tip is configured to puncture the plurality of tabs in the length direction of the at least one protrusion, wherein each of the at least one protrusion comprises a main section and a spike section that are connected to each other on the one side surface of the connection plate, wherein the spike section is connected to at least one end of the main section, and wherein in the length direction of the at least one protrusion, the main section extends straightly and has an identical cross section, and the spike section is formed as the tip in the plane perpendicular to the thickness direction of the connection plate.

2. The connection member according to claim 1, wherein the spike section has a cross section area decreasing in a direction from the main section to the spike section.

3. The connection member according to claim 1, wherein a cross section of the spike section parallel to the one side surface of the connection plate is formed in a semicircular, semi-elliptic, arcuate, trapezoidal or triangular shape.

4. The connection member according to claim 1, wherein a cross section of the spike section parallel to the one side surface of the connection plate is formed in a triangular shape, and wherein the spike section has an apex angle ranging from 20° to 120°.

5. The connection member according to claim 1, wherein:

a chamfered or rounded section is formed between an end of the spike section away from the main section and an end of the spike section away from the connection plate; or a chamfered or rounded section is formed between the end of the spike section away from the main section and an end of the main section away from the connection plate.

6. The connection member according to claim 1, wherein the spike section has a length smaller than or equal to 2 mm in a direction from the main section to the spike section.

7. The connection member according to claim 1, wherein each of the at least one protrusion comprises a connection section and a puncturing section that are connected to each other in a protruding height direction of the at least one protrusion, the connection section being connected to the connection plate, the puncturing section being connected to an end of the connection section away from the connection plate and being configured to puncture the plurality of tabs in the thickness direction of the connection plate.

8. The connection member according to claim 1, wherein the one side surface of the connection plate is in an arc connection with a side surface of the connection plate parallel to the thickness direction of the connection plate.

9. The connection member according to claim 1, wherein the connection plate and the at least one protrusion are integrally formed.

10. The connection member according to claim 1, wherein the at least one protrusion is arranged in a matrix on the one side surface of the connection plate.

11. A battery, comprising:

a current collector comprising a plurality of electrode plates laminated to each other, each of the plurality of electrode plates comprising a tab; and a conductive connection assembly comprising a connection member for electrically connecting a plurality of tabs of the current collector, the connection member comprising:

a connection plate; and at least one protrusion arranged on the connection plate and protruding from one side surface of the connection plate in a thickness direction of the connection plate, wherein:

at least one end of each of the at least one protrusion in a length direction of the at least one protrusion is formed as a tip in a plane perpendicular to the thickness direction of the connection plate;

the tip is configured to puncture the plurality of tabs in the length direction of the at least one protrusion; and the at least one protrusion of the connection member penetrates the plurality of tabs and is electrically connected to the tabs, wherein each of the at least one protrusion comprises a main section and a spike section that are connected to each other on the one side surface of the connection plate, wherein the spike section is connected to at least one end of the main section, and wherein in the length direction of the at least one protrusion, the main section extends straightly and has an identical cross section, and the spike section is formed as the tip in the plane perpendicular to the thickness direction of the connection plate.

12. The battery according to claim 11, wherein the at least one protrusion is electrically connected to the plurality of tabs by puncturing the plurality of tabs through a high-frequency vibration, and wherein a vibration direction of the high-frequency vibration is parallel to the length direction of the at least one protrusion.

13. The battery according to claim 11, wherein each of the plurality of electrode plates comprises a support insulation layer, a first conductive layer and a second conductive layer, the first conductive layer and the second conductive layer covering two side surfaces of the support insulation layer in a thickness direction of the support insulation layer, respectively.

14. The battery according to claim 11, wherein the spike section has a cross section area decreasing in a direction from the main section to the spike section.

15. The battery according to claim 11, wherein a cross section of the spike section parallel to the one side surface of the connection plate is formed in a semicircular, semi-elliptic, arcuate, trapezoidal or triangular shape.

16. The battery according to claim 11, wherein a cross section of the spike section parallel to the one side surface of the connection plate is formed in a triangular shape, and wherein the spike section has an apex angle ranging from 20° to 120°.

17. The battery according to claim 11, wherein:

a chamfered or rounded section is formed between an end of the spike section away from the main section and an end of the spike section away from the connection plate; or a chamfered or rounded section is formed between the end of the spike section away from the main section and an end of the main section away from the connection plate.

18. A battery pack, comprising the battery according to claim 11.

* * * * *